US010430968B2

(12) United States Patent
Houts et al.

(10) Patent No.: US 10,430,968 B2
(45) Date of Patent: Oct. 1, 2019

(54) VEHICLE LOCALIZATION USING CAMERAS

(71) Applicant: Ford Global Technologies, LLC, Dearborn, MI (US)

(72) Inventors: Sarah Houts, Sunnyvale, CA (US); Alexandru Mihai Gurghian, Palo Alto, CA (US); Vidya Nariyambut Murali, Sunnyvale, CA (US); Tory Smith, San Francisco, CA (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 25 days.

(21) Appl. No.: 15/458,611

(22) Filed: Mar. 14, 2017

(65) Prior Publication Data

US 2018/0268566 A1    Sep. 20, 2018

(51) Int. Cl.
| | | |
|---|---|---|
| *G06K 9/00* | (2006.01) |
| *G06T 7/73* | (2017.01) |
| *G06T 7/11* | (2017.01) |
| *G01S 17/02* | (2006.01) |
| *G01S 17/89* | (2006.01) |
| *G01S 17/93* | (2006.01) |

(52) U.S. Cl.
CPC .............. *G06T 7/74* (2017.01); *G01S 17/023* (2013.01); *G01S 17/89* (2013.01); *G01S 17/895* (2013.01); *G01S 17/936* (2013.01); *G06K 9/00798* (2013.01); *G06T 7/11* (2017.01); *G06T 2207/10024* (2013.01); *G06T 2207/10028* (2013.01); *G06T 2207/30244* (2013.01); *G06T 2207/30256* (2013.01)

(58) Field of Classification Search
CPC .......... G06F 17/2785; G06F 17/30247; G06F 17/3069; G06K 9/00791; G06K 9/00798; G05D 1/0088; G05D 1/0246; G05D 1/0212; G05D 1/0231; G05D 1/0276; G06T 2207/20212; G06T 7/70
See application file for complete search history.

(56) References Cited

U.S. PATENT DOCUMENTS

| | | | |
|---|---|---|---|
| 9,081,385 B1 * | 7/2015 | Ferguson | ........... G06K 9/00798 |
| 9,476,970 B1 | 10/2016 | Fairfield | |
| 9,836,671 B2 * | 12/2017 | Gao | ...................... G06K 9/6267 |

(Continued)

FOREIGN PATENT DOCUMENTS

| | | |
|---|---|---|
| KR | 101667484 B1 | 10/2016 |
| WO | WO-2015156821 A1 | 10/2015 |

*Primary Examiner* — Vu Le
*Assistant Examiner* — Guillermo M Rivera-Martinez
(74) *Attorney, Agent, or Firm* — David R. Stevens; Stevens Law Group

(57) ABSTRACT

According to one embodiment, a system for determining a position of a vehicle includes an image sensor, a top-down view component, a comparison component, and a location component. The image sensor obtains an image of an environment near a vehicle. The top-down view component is configured to generate a top-down view of a ground surface based on the image of the environment. The comparison component is configured to compare the top-down image with a map, the map comprising a top-down light LIDAR intensity map or a vector-based semantic map. The location component is configured to determine a location of the vehicle on the map based on the comparison.

20 Claims, 5 Drawing Sheets

(56) References Cited

U.S. PATENT DOCUMENTS

| | | | |
|---|---|---|---|
| 2009/0284597 A1* | 11/2009 | Nakamori | G06K 9/00798 |
| | | | 348/148 |
| 2010/0040285 A1* | 2/2010 | Csurka | G06K 9/00624 |
| | | | 382/170 |
| 2011/0018902 A1* | 1/2011 | Ofek | G06T 3/4038 |
| | | | 345/629 |
| 2011/0037725 A1* | 2/2011 | Pryor | G01C 21/3664 |
| | | | 345/174 |
| 2012/0050074 A1* | 3/2012 | Bechtel | B60R 1/04 |
| | | | 340/988 |
| 2015/0142248 A1 | 5/2015 | Han | |
| 2015/0166062 A1* | 6/2015 | Johnson | B60W 30/12 |
| | | | 701/41 |
| 2015/0292891 A1 | 10/2015 | Kojo | |
| 2016/0209846 A1 | 7/2016 | Eustice | |
| 2016/0210602 A1* | 7/2016 | Siddique | G06Q 20/0453 |
| 2017/0132526 A1* | 5/2017 | Cohen | G06N 99/005 |
| 2018/0005407 A1* | 1/2018 | Browning | G06T 7/70 |

\* cited by examiner

VEHICLE LOCALIZATION USING CAMERAS

TECHNICAL FIELD

The disclosure relates generally to methods, systems, and apparatuses for determining a location of a vehicle or image sensor based on a camera image and more particularly relates to methods, systems, and apparatuses for determining a vehicle location based on an image captured by a sensor and a map.

BACKGROUND

Automobiles provide a significant portion of transportation for commercial, government, and private entities. Autonomous vehicles and driving assistance systems are currently being developed and deployed to provide safety, reduce an amount of user input required, or even eliminate user involvement entirely. For example, some driving assistance systems, such as crash avoidance systems, may monitor driving, positions, and a velocity of the vehicle and other objects while a human is driving. When the system detects that a crash or impact is imminent the crash avoidance system may intervene and apply a brake, steer the vehicle, or perform other avoidance or safety maneuvers. As another example, autonomous vehicles may drive and navigate a vehicle with little or no user input. Accurate and fast vehicle localization is often necessary to enable automated driving systems or driving assistance systems to safely navigate roads or driving routes.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
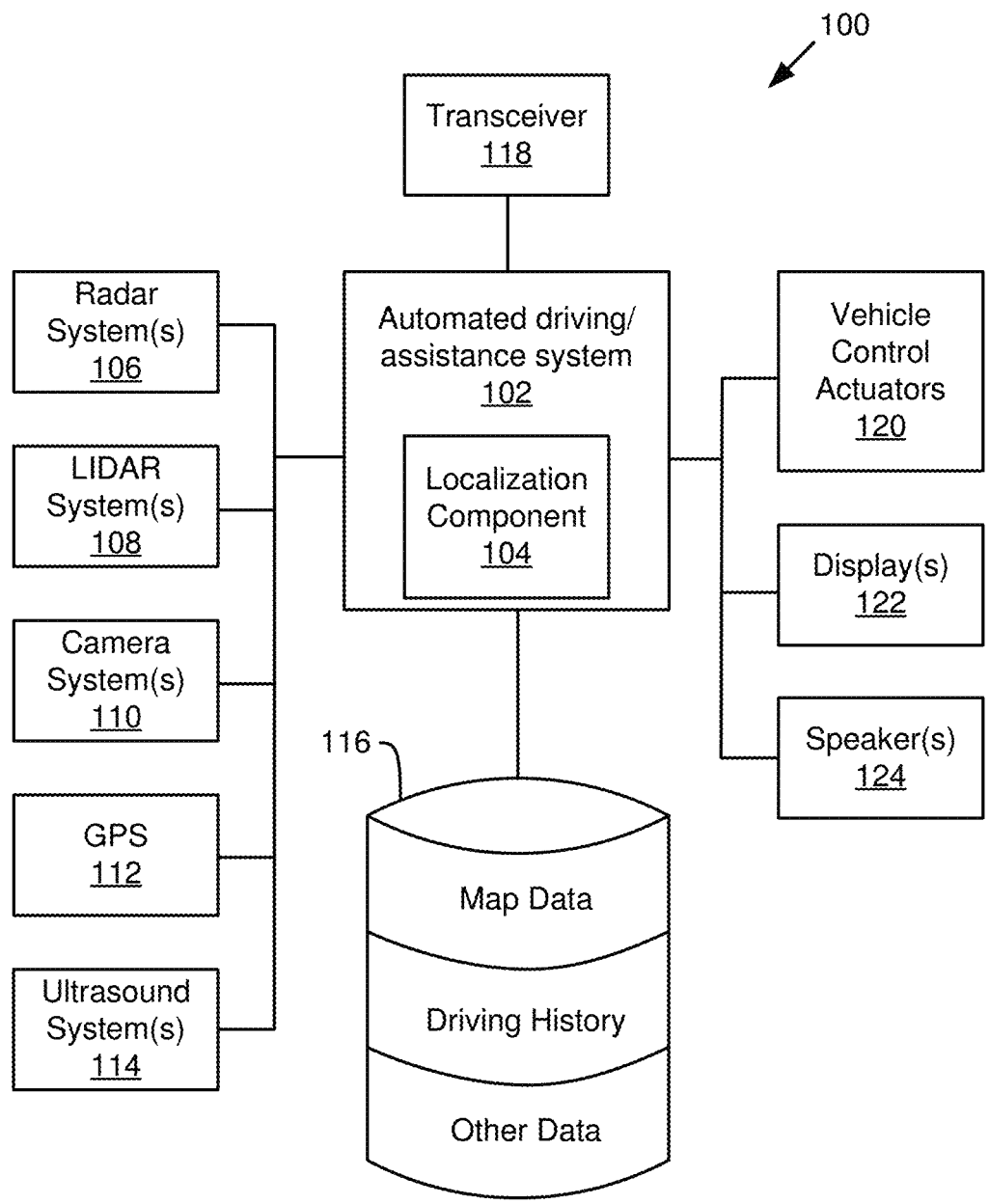
FIG. 1 is a schematic block diagram illustrating an implementation of a vehicle control system that includes an automated driving/assistance system.

Localization is an important part of allowing for and improving operation of autonomous vehicles or driver assistance features. For example, a vehicle must know precisely where it is in the world (or with respect to a map) in order to navigate safely. A large variety of current approaches exist to localize with respect to a map of the world, but require a substantial quantity of computation to do so, or necessitate the use of expensive, power-hungry sensors, such as light detection and ranging (LIDAR) sensors.

Applicants have developed systems, methods, and devices for localization for vehicles or other purposes that may not need an active LIDAR sensor. According to one embodiment, a system for determining a position of a vehicle includes an image sensor, a top-down view component, a comparison component, and a location component. The image sensor obtains an image of an environment near a vehicle. The top-down view component is configured to generate a top-down view of a ground surface based on the image of the environment. The comparison component is configured to compare the top-down image with a map, the map comprising a top-down light LIDAR intensity map or a vector-based semantic map. The location component is configured to determine a location of the vehicle on the map based on the comparison.

In at least one approach present in the present disclosure, a camera-based system on a vehicle may be used to localize the vehicle with respect to a prior generated or obtained map. The prior map could be a vector-based semantic map that contains information like the locations of lane lines and other road markings. An example of a vector base semantic map is the Road Network Definition File (RNDF) provided by the Defense Advanced Research Projects Agency (DARPA) for the Urban Challenge. The prior map may include a LIDAR intensity map of the ground plane. The prior map may be compared a projected top-down image generated based on a captured camera image.

The projected top-down image may be created or extracted by segmenting a ground plane in the image. The ground plane may be segmented using a pair of images (such as from two cameras or from a single camera at different points in time) using a Random Sample Consensus (RANSAC) algorithm to determine the ground plane. The pair of images provides a set of points in 3D space. A plurality of randomly selected hypothesis of the ground plane may be evaluated to find the hypotheses with the best set of inliers.

In one embodiment, an image from the map is also extracted. For a vector map, a synthetic image may be generated where the road surface is dark and road markings (such as painted lines) are bright. In one embodiment, a LIDAR intensity map may be compared directly without generating a synthetic image since road surfaces are generally not reflective and line paint or other lane markings are generally highly reflective. A process of comparing the two images (the camera derived image and the map derived image) may be done by calculating a score for the match between various relative positions using a technique such as mutual information, or by using image comparison techniques that directly provide a best-fit relative position.

One or more embodiments disclosed herein provide significant benefits over previously available technologies. For example, at least one embodiment uses camera information to do localization, unlike many localization approaches currently in use that use active LIDAR sensors. As passive sensors, cameras are much cheaper, smaller, lighter, and less power-intensive than an active sensor such as LIDAR sensors.

Other available camera-based localization approaches transform the prior map into the frame of the single camera image for all the hypothesis positions. For example, the following discuss approaches that project a map onto a camera frame: Miller et al. 2011 Journal of Field Robotics "Map-Aided Localization in Sparse Global Positioning System Environments Using Vision and Particle Filtering"; •Wolcott and Eustice 2014 "Visual Localization within LIDAR Maps for Automated Urban Driving"; Pink 2008 "Visual Map Matching and Localization Using a Global Feature Map"; Pink et al. 2009 "Visual Features for Vehicle Localization and Ego-Motion Estimation". The following approach uses camera to camera matching: Napier and Newman 2012 "Generation and Exploitation of Local Orthographic Imagery for Road Vehicle Localization".

However, transforming the prior map into the frame of the single camera image for all the hypothesis positions is computationally expensive. At least one approach disclosed herein projects the camera image into a top-down view, and thus only one transformation or projection is required. The generation of the top-down view may require some more up front computation costs, but then may use significantly less to generate the hypothesis measurements because the map is already in a top-down frame. Thus, map transformations into a hypothesized camera frame at various locations of the map is avoided. Applicants have recognized that, for most approaches, generating the hypothesis measurements is the largest user of computation, so generation of a top-down image will enable localization with less computation as well as a cheaper, less power-intensive sensor than LIDAR approaches.

Further embodiments and examples will be discussed in relation to the figures below.

Referring now to the figures, FIG. 1 illustrates an example vehicle control system 100 that may be used to automatically localize a vehicle. The automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. The automated driving/assistance system 102 may use a neural network, or other model or algorithm to detect or localize objects based on perception data gathered by one or more sensors.

The vehicle control system 100 also includes one or more sensor systems/devices for detecting a presence of objects near or within a sensor range of a parent vehicle (e.g., a vehicle that includes the vehicle control system 100). For example, the vehicle control system 100 may include one or more radar systems 106, one or more LIDAR systems 108, one or more camera systems 110, a global positioning system (GPS) 112, and/or one or more ultrasound systems 114. The vehicle control system 100 may include a data store 116 for storing relevant or useful data for navigation and safety such as map data, driving history or other data. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator which may be seen by a driver or passenger of a vehicle. The speakers 124 may include one or more speakers of a sound system of a vehicle or may include a speaker dedicated to driver notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time.

In one embodiment, the vehicle control system 100 includes a localization component 104 to determine a location of the vehicle with respect to map, roadway, or the like. For example, the localization component 104 may use an on-board camera to localize the vehicle with respect to a prior created or obtained map. In one embodiment, the localization component 104 may enable the vehicle control system 100 to localize the vehicle without using active sensors such as LIDAR or radar, which emit energy in the environment and detect reflections. The map may include a vector-based semantic map or a LIDAR intensity map. A projected top-down image derived from the camera is created and compared to either a previously made vector or a LIDAR intensity map. The comparing process can be done by using technique like mutual information or by comparison techniques that provide a best-fit relative position.

Figure 2:
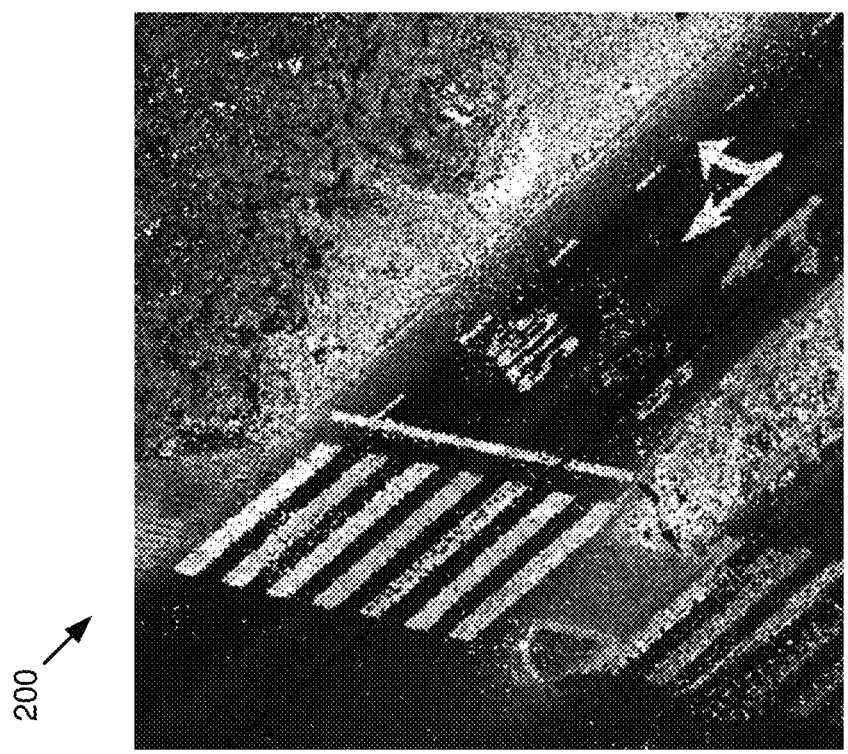
FIG. 2 illustrates an example LIDAR intensity image, according to one implementation.

FIG. 2 illustrates an example LIDAR intensity image 200 which may be used as a map or part of a map. For example, the LIDAR intensity image may be part of previously obtained aerial or top-down LIDAR views of roadways that may be used as a map for locating a vehicle. As illustrated, LIDAR intensity data can provide high contrast between road surfaces and lane markings, such as the line markings illustrated.

Figure 3:
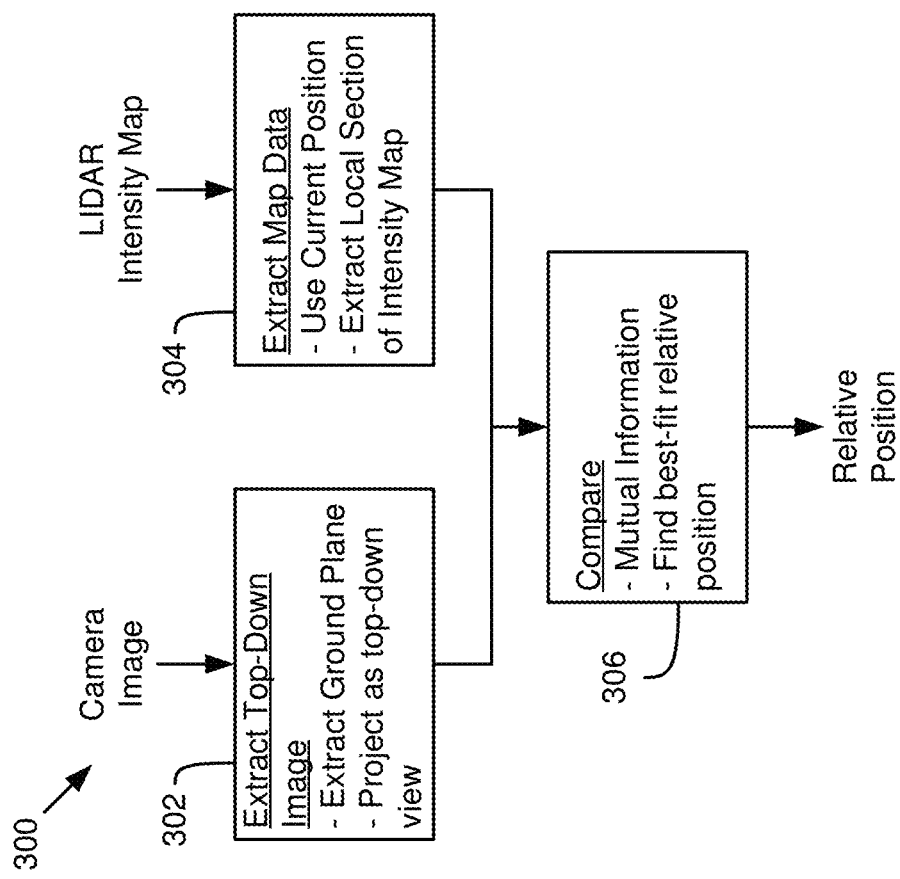
FIG. 3 is a schematic flow chart diagram illustrating a method for localization using a camera image and a LIDAR intensity map, according to one implementation.

FIG. 3 is a schematic block diagram illustrating a method 300 for localization using a camera image and a LIDAR intensity map. The method 300 may be performed by a localization component or other system, such as the localization component 104 or automated driving/assistance system 102 of FIG. 1. The localization component 104 may receive a camera image and/or a LIDAR intensity map. The camera image may include an image captured by a camera of a parent vehicle. The LIDAR intensity map may include a map for locating the vehicle within a specific geographic or other location.

The localization component 104 extracts 302 a top-down image from the camera image. For example, the localization component 104 may extract a ground plane or driving surface from within the camera image. Extracting the ground plane may involve identifying pixels or regions within the camera image that correspond to the ground plane or driving surface. For example, the ground plane or driving surface may be identified using a RANSAC algorithm based on the camera image and another camera image (such as an image captured by another camera or an earlier or later image captured by the same camera). The localization component may then create the top-down image by projecting the ground plane or driving surface as a top down image. For example, the ground plane or driving surface may be skewed or rotated to create a top-down view of the ground plane or driving surface. The resulting top-down image or top-down view may be a top-down view of the pavement or driving surface only.

The localization component 104 may extract 304 map data that includes a region where the vehicle is located. For example, the localization component 104 may determine an approximate location for the camera/vehicle using a GPS receiver, wireless network location, or the like. Based on the approximate location, the localization component 104 may select or extract a local portion of a map (such as a LIDAR intensity map) as an image for localization. The localization component 104 may extract map data for a region of a roadway where the vehicle is located.

With the extracted top-down view and the local region of the LIDAR intensity map, the localization component 104 compares 306 the images to determine a location of the vehicle or camera. The localization component 104 compares 306 the extracted top-down image (top down view) with various locations or relative positions within the LIDAR intensity map. The localization component 104 may compare the different locations in the image using a mutual information algorithm or other algorithm to find the best fit or best relative position between the ground plane and the map. After comparing 306, the result may be a relative position of the camera image with the LIDAR intensity map that indicates the position of the vehicle.

Figure 4:
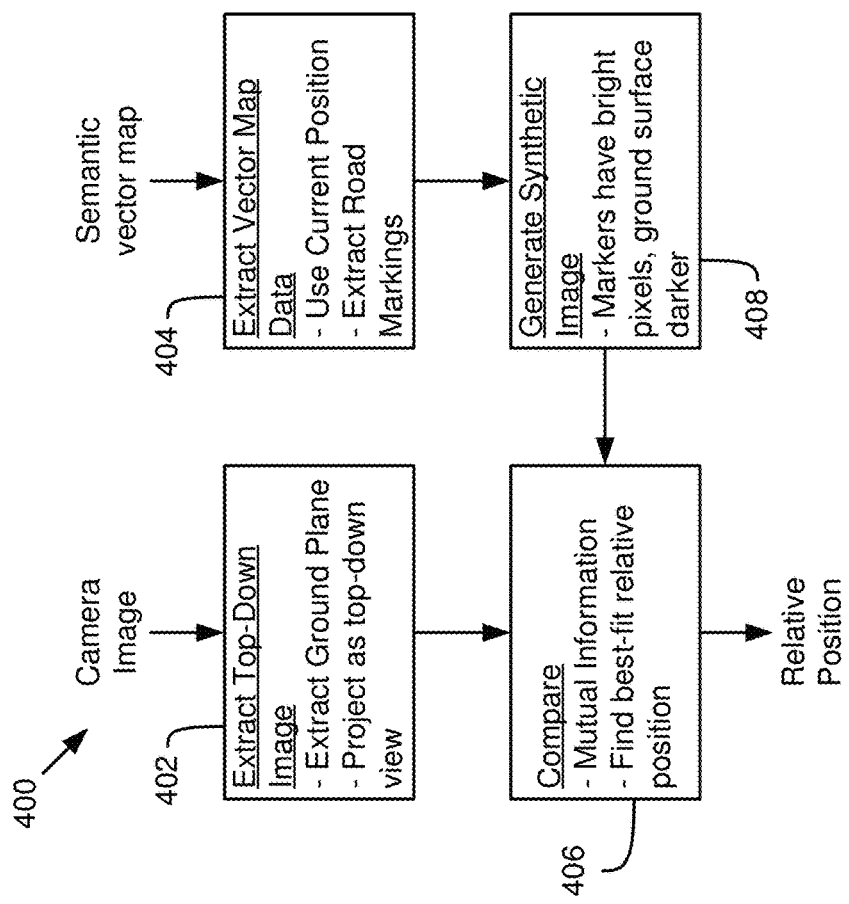
FIG. 4 is a schematic flow chart diagram illustrating a method for localization using a camera image and a semantic vector map (vector-based semantic map), according to one implementation.

FIG. 4 is a schematic block diagram illustrating a method 400 for localization using a camera image and a semantic vector map. The method 400 may be performed by a localization component or other system, such as the localization component 104 or automated driving/assistance system 102 of FIG. 1. The localization component 104 may receive a camera image and/or a semantic vector map. The camera image may include an image captured by a camera of a parent vehicle. The semantic vector map may include a map for locating the vehicle within a specific geographic or other location.

The localization component 104 extracts 402 a top-down image from the camera image. For example, the localization component 104 may extract a ground plane or driving surface from within the camera image. Extracting the ground plane may involve identifying pixels or regions within the camera image that correspond to the ground plane or driving surface. For example, the ground plane or driving surface may be identified using a RANSAC algorithm based on the camera image and another camera image (such as an image captured by another camera or an earlier or later image captured by the same camera). The localization component 104 may then create the top-down image by projecting the ground plane or driving surface as a top down image. For example, the ground plane or driving surface may be skewed or rotated to create/simulate a top-down view of the ground plane or driving surface. The resulting top-down image or top-down view may be a top-down view of the pavement or driving surface only.

The localization component 104 may extract 404 map data that includes a region where the vehicle is located. For example, the localization component 104 may determine an approximate location for the camera/vehicle using a GPS receiver, wireless network location, or the like. Based on the approximate location, the localization component 104 may select or extract a local portion of a map (such as of the semantic vector map) as an image for localization. The localization component 104 may extract map data for a region of a roadway where the vehicle is located. The localization component 104 may extract road markings, such as paint lines, for the portion of the semantic vector map.

The localization component 104 generates 408 a synthetic image based on the semantic vector map (or the extracted portion of the vector map). In one embodiment, the localization component 104 generates the synthetic image by making regions corresponding to the lane markings (e.g., paint lines) a light color and regions corresponding to the road surface (e.g., pavement) a dark color. For example, lane lines may be white or light grey and the road surface may be black or dark grey.

With the extracted top-down view and the synthetic image of the local region of the semantic vector map, the localization component 104 compares 406 the images to determine a location of the vehicle or camera. The localization component 104 compares 406 the extracted top-down image (top down view) with various locations or relative positions within the synthetic image. The localization component 104 may compare the different locations in the image using a mutual information algorithm or other algorithm to find the best fit or best relative position between the ground plane and the map. After comparing 406, the result may be a relative position of the camera image with the LIDAR intensity map that indicates the position of the vehicle.

Figure 5:
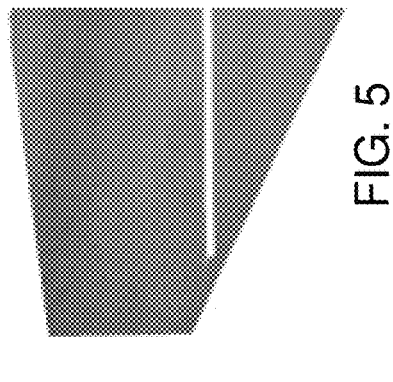
FIG. 5 illustrates an example projected top-down image, according to one implementation.
Figure 6:
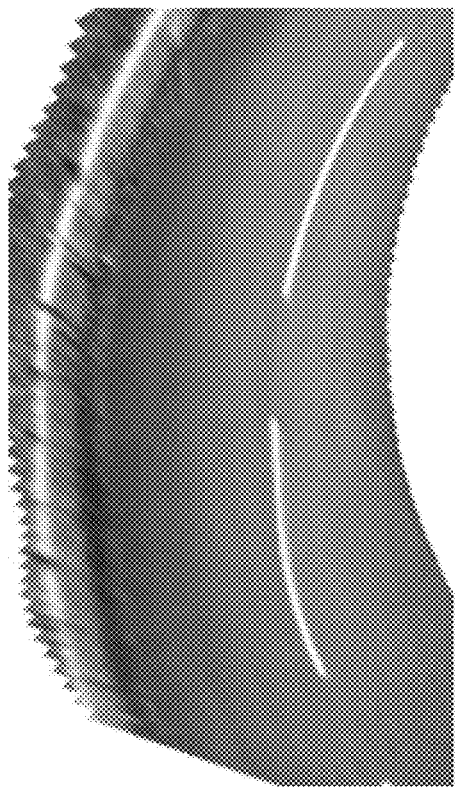
FIG. 6 illustrates an example accumulation of projected top-down images, according to one implementation.

FIG. 5 illustrates a top-down image generated by projecting a camera image as a top-down view. For example, the original camera image may have been rectangular in shape and the image has been skewed to create a projected top-down image. FIG. 6 illustrates an accumulated view of a plurality of top-down images. For example, a plurality of images captured over time or from different cameras, project them as top-down images, and stitch or overlaid to create the accumulated view. During comparison, either a single top down image or an accumulated top down image may be compared with the map (synthetic image of a semantic vector map or LIDAR intensity data).

Figure 7:
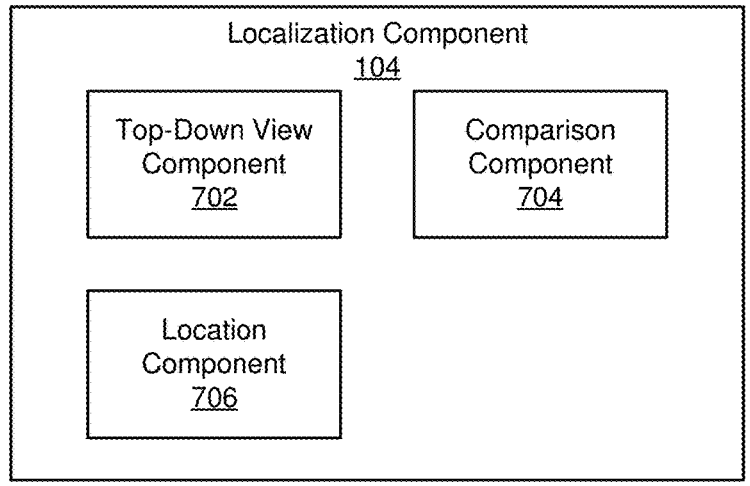
FIG. 7 is a schematic block diagram illustrating components of a localization component, according to one implementation.

Turning to FIG. 7, a schematic block diagram illustrating components of a localization component 104, according to one embodiment, is shown. The localization component 104 may locate the vehicle on a map, or with respect to markings on a roadway or a roadway, according to any of the embodiments or functionality discussed herein. The localization component 104 includes a top-down view component 702, a comparison component 704, and a location component 706. The components 702-706 are given by way of illustration only and may not all be included in all embodiments. In fact, some embodiments may include only one or any combination of two or more of the components 702-706. For example, some of the components may be located outside or separate from the localization component 104.

The top-down view component 702 is configured to generate a top-down view of a ground surface or driving surface based on a camera image captured by an image sensor on a vehicle. For example, a camera system 110 of the vehicle control system 100 may capture an image of an environment near the vehicle, such as in front of, to the side, or behind the vehicle. The top-down view component 702 may generate a top-down view of the ground surface or driving surface within the vehicle. For example, in one embodiment, the top-down view component 702 projects the ground surface portion of the image from the actual view (e.g., a horizontal or non-vertical orientation of the camera) into a top-down view (e.g., a vertical downward or aerial view) of the ground surface portion. In one embodiment, the top-down view component 702 segments the driving plane or ground plane from the image. For example, the top-down view component 702 may identify pixels in the image that correspond to a ground surface or driving surface. In one embodiment, the RANSAC algorithm may be used to identify pixels that correspond to the ground surface. The pixels corresponding to the ground or driving surface may be extracted or segmented from the original image. For example, all non-ground pixels may be made transparent.

After determining which pixels correspond to a ground or driving surface, the top-down view component 702 may project those pixels as a top-down view. For example, the original camera may have captured the image at a horizontal or near horizontal angle. The top-down view component 702 may project the pixels as a top-down view by skewing, rotating, and/or stretching the pixels corresponding to the ground surface as if they were captured from downward angle. For example, the top-down view component 702 may generate an estimated top-down view of the roadway or ground surface by projecting the segmented pixels into a downward view. In one embodiment, a positioning angle of a camera is known or is determined based on accelerometers on the vehicle or camera. A projection may then project the ground surface from the original angle to a vertical downward angle. Thus, the projected image may be an estimate of what would be visible if a camera or the like captured an aerial view of the roadway.

The comparison component 704 is configured to compare a top-down image generated by the top-down view component 702 to a map or image based on a map. In one embodiment, the map includes a vector-based semantic map (semantic vector map). The vector-based semantic map may include details about the locations and distances of road features such as road edges, lane lines, intersections, or the like. The comparison component 704 may generate a synthetic image based on the vector-based semantic map which may then be compared with the projected top-down image generated by the top-down view component 702. In one embodiment, the comparison component 704 generates a synthetic image that includes dark pixels for a road surface and light or bright pixels for road markings. This synthetic image may approximate what a roadway with lane lines would look form a top view or aerial view. The comparison component 704 may then compare the top-down image with the map by comparing the top-down image with the synthetic image. In one embodiment, the map includes LIDAR intensity data which may be compared directly to the top-down image without first generating a synthetic image.

The comparison component 704 may compare the top-down image with the map (or the synthetic image) using a mutual information algorithm or a best-fit algorithm. The comparison component 704 may calculate a score indicating a match between a plurality of positions of the top-down image on the map. For example, the comparison component 704 may position the top-down image randomly on top of the LIDAR intensity data or synthetic image and calculate a similarity score between the top-down image and the portion of the LIDAR intensity data or synthetic image that it overlaps with. For example, the more similar the location of boundaries, pixel intensities, or the like between the top-down image and the map data (LIDAR intensity data or synthetic image), the higher the score. By calculating for a plurality of different locations, a number of different scored can be obtained for the different relative positions of the top-down image and the map data.

The location component 706 is configured to determine a location of the vehicle on the map based on the comparison. In one embodiment, the location component 706 select a relative position from a plurality of relative positions compared by the comparison component 704. For example, the location component 706 may select a location that generated the highest score in a comparison using the mutual information algorithm or best fit algorithm.

Figure 8:
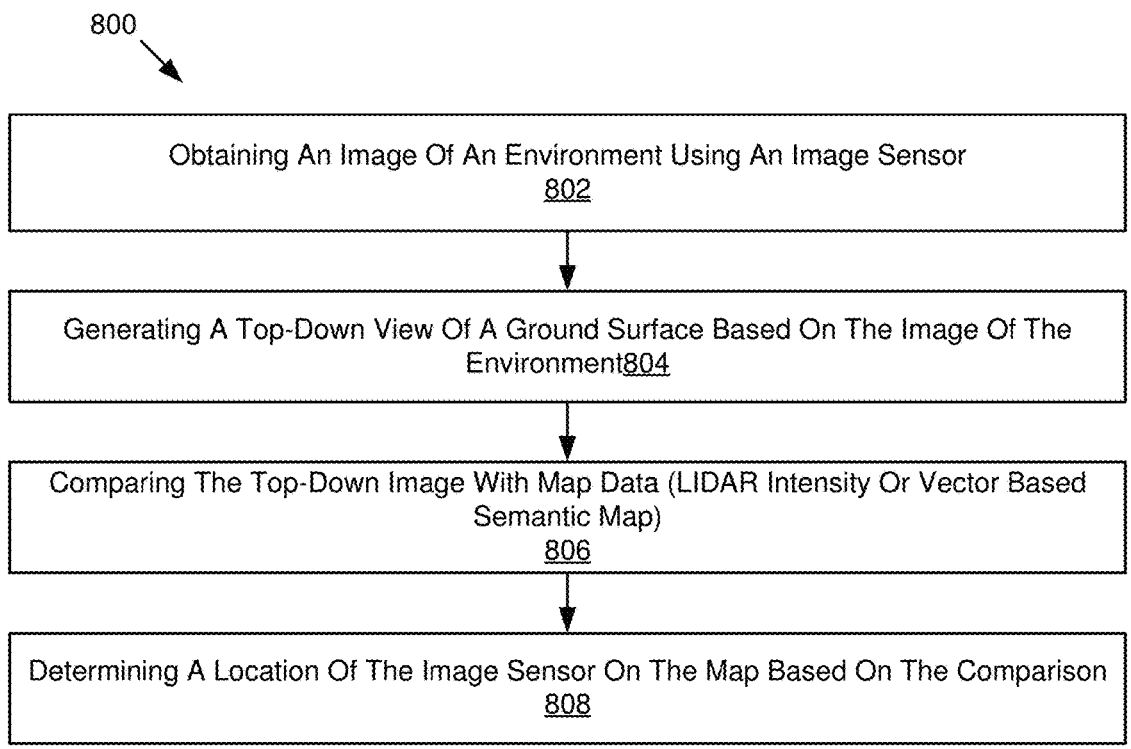
FIG. 8 is a schematic flow chart diagram illustrating a method for localization, according to one implementation.

FIG. 8 a schematic flow chart diagram illustrating a method 800 for determining a location of a vehicle. The method 800 may be performed by a localization component or vehicle control system such as the localization component 104 of FIG. 1 or 7 or the vehicle control system 100 of FIG. 1.

The method 800 begins and an image sensor mounted on a vehicle obtains 802 an image of an environment near a vehicle using an image sensor. A top-down view component 702 generates 804 a top-down view of a ground surface based on the image of the environment. A comparison component 704 compares 806 the top-down image with a map. The map may include a top-down LIDAR intensity (e.g., aerial LIDAR) map or a vector-based semantic map. A location component 706 determines 808 a location of the image sensor on the map based on the comparison.

Figure 9:
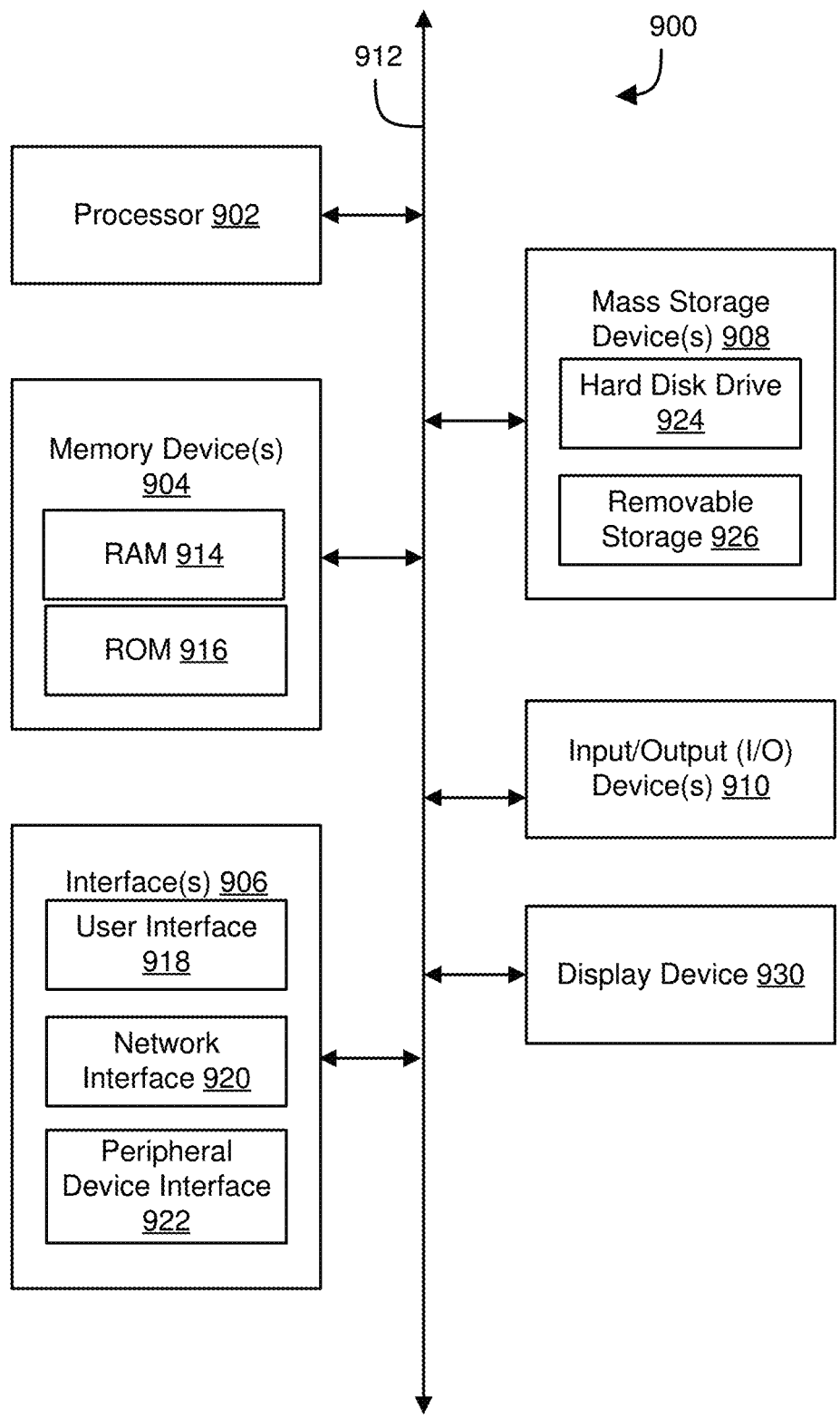
FIG. 9 is a schematic block diagram illustrating a computing system, according to one implementation.

Referring now to FIG. 9, a block diagram of an example computing device 900 is illustrated. Computing device 900 may be used to perform various procedures, such as those discussed herein. In one embodiment, the computing device 900 can function as a localization component 104, automated driving/assistance system 102, vehicle control system 100, or the like. Computing device 900 can perform various monitoring functions as discussed herein, and can execute one or more application programs, such as the application programs or functionality described herein. Computing device 800 can be any of a wide variety of computing devices, such as a desktop computer, in-dash computer, vehicle control system, a notebook computer, a server computer, a handheld computer, tablet computer and the like.

Computing device 900 includes one or more processor(s) 902, one or more memory device(s) 904, one or more interface(s) 906, one or more mass storage device(s) 908, one or more Input/Output (I/O) device(s) 910, and a display device 930 all of which are coupled to a bus 912. Processor(s) 902 include one or more processors or controllers that execute instructions stored in memory device(s) 904 and/or mass storage device(s) 908. Processor(s) 902 may also include various types of computer-readable media, such as cache memory.

Memory device(s) 904 include various computer-readable media, such as volatile memory (e.g., random access memory (RAM) 914) and/or nonvolatile memory (e.g., read-only memory (ROM) 916). Memory device(s) 904 may also include rewritable ROM, such as Flash memory.

Mass storage device(s) 908 include various computer readable media, such as magnetic tapes, magnetic disks, optical disks, solid-state memory (e.g., Flash memory), and so forth. As shown in FIG. 9, a particular mass storage device is a hard disk drive 924. Various drives may also be included in mass storage device(s) 908 to enable reading from and/or writing to the various computer readable media. Mass storage device(s) 908 include removable media 926 and/or non-removable media.

I/O device(s) 910 include various devices that allow data and/or other information to be input to or retrieved from computing device 900. Example I/O device(s) 910 include cursor control devices, keyboards, keypads, microphones, monitors or other display devices, speakers, printers, network interface cards, modems, and the like.

Display device 930 includes any type of device capable of displaying information to one or more users of computing device 900. Examples of display device 930 include a monitor, display terminal, video projection device, and the like.

Interface(s) 906 include various interfaces that allow computing device 900 to interact with other systems, devices, or computing environments. Example interface(s) 906 may include any number of different network interfaces 920, such as interfaces to local area networks (LANs), wide area networks (WANs), wireless networks, and the Internet. Other interface(s) include user interface 918 and peripheral device interface 922. The interface(s) 906 may also include one or more user interface elements 918. The interface(s) 906 may also include one or more peripheral interfaces such as interfaces for printers, pointing devices (mice, track pad, or any suitable user interface now known to those of ordinary skill in the field, or later discovered), keyboards, and the like.

Bus 912 allows processor(s) 902, memory device(s) 904, interface(s) 906, mass storage device(s) 908, and I/O device(s) 910 to communicate with one another, as well as other devices or components coupled to bus 912. Bus 912 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 900, and are executed by processor(s) 902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method for localization. The method includes obtaining an image of an environment using an image sensor. The method includes generating a top-down view of a ground surface based on the image of the environment. The method includes comparing the top-down image with a map, the map including a top-down LIDAR intensity map or a vector-based semantic map. The method includes determining a location of the image sensor on the map based on the comparison.

In Example 2, the method of Example 1 further includes segmenting the driving plane or ground plane from the image and projecting the image as a top-down image to generate the top-down view.

In Example 3, the obtaining the image as in any of Examples 1-2 includes capturing the image using the image sensor, wherein the image sensor is mounted on a vehicle.

In Example 4, the map of any of Examples 1-3 includes the vector-based semantic map, the method further including generating a synthetic image.

In Example 5, the comparing the top-down image with the map of Example 4 includes comparing the top-down image with the synthetic image.

In Example 6, the generating the synthetic image of Example 4 includes generating a synthetic image including dark pixels for a road surface and light or bright pixels for road markings.

In Example 7, the comparing the top-down image with the map of any of Examples 1-6 includes comparing using one or more of a mutual information algorithm or a best-fit algorithm.

In Example 8, the comparing the top-down image with the map of any of Examples 1-7 includes calculating a score for a plurality of relative positions and selecting a relative position.

Example 9 is computer readable storage media storing instructions that, when executed by one or more processors, cause the one or more processors to implement a method as in any of Examples 1-8.

Example 9 is a system or device that includes means for implementing a method or realizing a system or apparatus in any of Examples 1-9.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method for localizing a vehicle, the method comprising:
    obtaining an image of an environment of the vehicle;
    segmenting a ground plane from the image to determine segmented ground plane pixels, wherein the segmenting comprises applying random sample consensus and determining a set of points in the image for the ground plane;
    generating a top-down view of the ground plane by projecting the segmented ground plane pixels to approximate a view of a camera facing downward from the vehicle;
    comparing the top-down view with a map, the map comprising a top-down light detection and ranging (LIDAR) intensity map or a vector-based semantic map; and
    determining a location of the vehicle on the map based on the comparison of the top-down view of the ground plane and the map.

2. The method of claim 1, wherein segmenting the ground plane from the image comprises analyzing a stereo pair of images providing points in three-dimensional space and applying the random sample consensus by randomly selecting hypothesis points pertaining to the ground plane and evaluating the hypothesis points to determine the set of points in the image that are the good fit for the ground plane.

3. The method of claim 1, wherein obtaining the image comprises capturing the image using a camera of the vehicle.

4. The method of claim 1, wherein the map comprises the vector-based semantic map and the method further comprises generating a synthetic image.

5. The method of claim 4, wherein comparing the top-down view with the map comprises comparing the top-down view with the synthetic image.

6. The method of claim 4, wherein generating the synthetic image comprises generating a synthetic image comprising dark pixels for a road surface and light or bright pixels for road markings.

7. The method of claim 1, wherein comparing the top-down view with the map comprises comparing using one or more of:
a mutual information algorithm; or
a best-fit algorithm.

8. The method of claim 1, wherein comparing the top-down view with the map comprises calculating a score for a plurality of relative positions and selecting a relative position.

9. A system for localizing a vehicle, the system comprising:
an image sensor to obtain an image of an environment near the vehicle; and
a processor that is programmable to execute instructions stored in non-transitory computer readable storage media, the instructions comprising:
receiving the image of the environment of the vehicle from the image sensor;
segmenting a ground plane from the image to determine segmented ground plane pixels, wherein the segmenting comprises applying random sample consensus and determining a set of points in the image for the ground plane;
generating a top-down view of the ground plane by projecting the segmented ground plane pixels to approximate a view of a camera facing downward from the vehicle;
comparing the top-down view with a map, the map comprising a top-down light detection and ranging (LIDAR) intensity map or a vector-based semantic map; and
determining a location of the vehicle on the map based on the comparison of the top-down view of the ground plane and the map.

10. The system of claim 9, wherein segmenting the ground plane from the image comprises analyzing a stereo pair of images providing points in three-dimensional space and applying the random sample consensus by randomly selecting hypothesis points pertaining to the ground plane and evaluating the hypothesis points to determine the set of points in the image that are the good fit for the ground plane.

11. The system of claim 9, wherein the image sensor is a monocular camera mounted on the vehicle.

12. The system of claim 9, wherein the map comprises the vector-based semantic map and the instructions further comprise generating a synthetic image based on the vector-based semantic map.

13. The system of claim 12, wherein comparing the top-down view with the map comprises comparing the top-down view with the synthetic image.

14. The system of claim 12, wherein generating the synthetic image comprises generating a synthetic image comprising dark pixels for a road surface and light or bright pixels for road markings.

15. The system of claim 9, wherein comparing the top-down view with the map comprises comparing using one or more of:
a mutual information algorithm; or
a best-fit algorithm.

16. The system of claim 9, wherein the instructions further comprise calculating a score for a plurality of relative positions and selecting a relative position from the plurality of relative positions as the location of the vehicle on the map.

17. Non-transitory computer readable storage media storing instructions that, when executed by one or more processors, cause the one or more processors to:
obtain an image of an environment near a vehicle;
segment a ground plane from the image to determine segmented ground plane pixels, wherein the segmenting comprises applying random sample consensus and determining a set of points in the image for the ground plane;
generate a top-down view of the ground plane by projecting the segmented ground plane pixels to approximate a view of a camera facing downward from the vehicle;
compare the top-down view with a map, the map comprising a top-down light detection and ranging (LIDAR) intensity map or a vector-based semantic map; and
determine a location of the vehicle on the map based on the comparison of the top-down view of the ground plane and the map.

18. The non-transitory computer readable storage media of claim 17, wherein the instructions cause the one or more processors to segment the ground plane from the image by analyzing a stereo pair of images providing points in three-dimensional space and applying the random sample consensus by randomly selecting hypothesis points pertaining to the ground plane and evaluating the hypothesis points to determine the set of points in the image that are the good fit for the ground plane.

19. The non-transitory computer readable storage media of claim 17, wherein the map comprises the vector-based semantic map and wherein the instructions further cause the one or more processors to:
generate a synthetic image comprising dark pixels for a road surface and light or bright pixels for road markings based on the vector-based semantic map; and
compare the top-down view with the map by comparing the top-down view with the synthetic image.

20. The non-transitory computer readable storage media of claim 17, wherein the instructions cause the processors to compare the top-down view with the map using one or more of:
a mutual information algorithm; or
a best-fit algorithm.

* * * * *